US 6,683,268 B2

(12) United States Patent
Briand et al.

(10) Patent No.: US 6,683,268 B2
(45) Date of Patent: Jan. 27, 2004

(54) APPLICATION OF A HYBRID ARC/LASER PROCESS TO THE WELDING OF PIPE

(75) Inventors: Francis Briand, Paris (FR); Christian Bonnet, Puiseux-Pontoise (FR)

(73) Assignee: L'Air Liquide-Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 65 days.

(21) Appl. No.: 09/870,015

(22) Filed: May 31, 2001

(65) Prior Publication Data

US 2001/0052511 A1 Dec. 20, 2001

(30) Foreign Application Priority Data

May 31, 2000 (FR) .............................. 00 07010

(51) Int. Cl.$^7$ .......................... B23K 31/02; B23K 26/00
(52) U.S. Cl. ....................................................... 219/61
(58) Field of Search ............................................. 219/61

(56) References Cited

U.S. PATENT DOCUMENTS

| | | | | |
|---|---|---|---|---|
| 4,258,242 A | * | 3/1981 | Fujimori et al. | 219/137 R |
| 4,320,277 A | * | 3/1982 | Taira et al. | 219/61 |
| 5,866,870 A | * | 2/1999 | Walduck | 219/121.45 |

FOREIGN PATENT DOCUMENTS

| | | | |
|---|---|---|---|
| EP | 0 496 231 | | 7/1992 |
| JP | 41079654 A | * | 7/1976 |
| JP | 60231574 A | * | 11/1985 |
| JP | 61003682 A | * | 1/1986 |
| JP | 01241392 A | * | 9/1989 |
| WO | WO 96/09135 | | 3/1996 |

OTHER PUBLICATIONS

Matsuda et al., "Tig or Mig Arc Augmented Laser Welding of Thick Mild Steel Plate", 1998, pp. 31–34 *Joining & Materials, Welding Institute, Abington, 6B*, XP–000937541.

* cited by examiner

*Primary Examiner*—M. Alexandra Elve
*Assistant Examiner*—Kevin McHenry
(74) *Attorney, Agent, or Firm*—Young & Thompson

(57) ABSTRACT

Process for manufacturing a welded pipe from a metal strip having two longitudinal edges approximately parallel to each other, which are brought together so as to come approximately into contact with each other and thus form an unwelded pre-tube, the pre-tube then being welded in order to join the edges together. The two edges are welded together to obtain a welded metal pipe by using, approximately simultaneously, at least one laser beam and at least one electric arc, that is to say using a hybrid arc/laser, preferably plasma/laser, welding process. This process can be used to produce weld seams of rectilinear, helicoidal or spiraled shape.

12 Claims, 1 Drawing Sheet

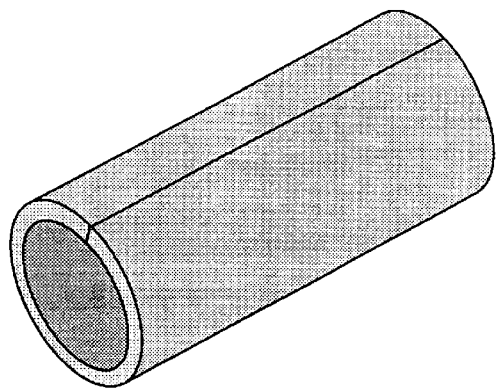
Figure 1
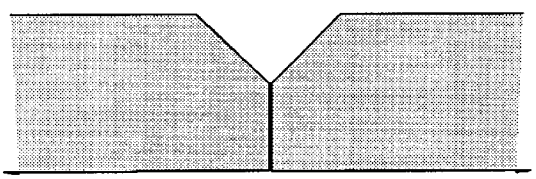 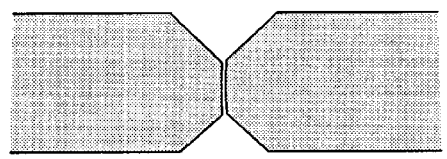
Figure 2 Figure 3

APPLICATION OF A HYBRID ARC/LASER PROCESS TO THE WELDING OF PIPE

FIELD OF THE INVENTION

The present invention relates to a hybrid welding process and to a hybrid welding set combining a laser beam and an electric arc, particularly a plasma arc, and to its application to the welding of pipes.

BACKGROUND OF THE INVENTION

Laser technology has been known and widely used for years to weld various metallic materials, such as workpieces made of alloy steels or non-alloy steels, coated steels, stainless steels, aluminium and aluminium alloys, or to weld pipes made of various metals.

In general, a laser welding set for welding pipe comprises, apart from the means for feeding and holding the pipe, a solid-state or gas laser oscillator producing a coherent monochromatic high-energy beam, an optical path provided with deviating mirrors or else an optical fibre allowing the laser beam to be conveyed to a welding head located opposite the pipe to be welded.

Conventionally, the welding head comprises a lens or one or more focusing mirrors so as to focus the laser beam onto one or more focal points in the thickness of the material to be welded and in the joint plane obtained by bringing together, edge to edge, the longitudinal edges of the metal sheet to be welded into the form of a tube ("O" forming), so as to locally concentrate sufficient power density to melt the material to be welded.

Usually, the welding head comprises a gas feed device for feeding with welding gas, also called assist gas, by means of a gas delivery nozzle placed coaxially with the laser beam. This gas feed device may also be external to the actual laser welding head.

An alternative solution for welding the edges to be joined together to form a tube consists in melting the said edges to be joined together in the joint plane by means of one or more electric arcs and using gas either as shielding gas or as active gas.

Such welding processes are also commonly used in industry; depending on the case, these are TIG (Tungsten Inert Gas), MIG (Metal Inert Gas), MAG (Metal Active Gas) processes or else plasma-arc or submerged-arc processes.

Such welding processes are described for example in the following documents: EP-A-847831, U.S. Pat. No. 4,673,121, EP-A-136276, JP-A-58148096, JP-A-03198998, JP-A-03198997, EP-A-896853, U.S. Pat. No. 5,192,016, U.S. Pat. No. 4,738,714, EP-A-899052, JP-A-58107294, EP-A-234623, U.S. Pat. No. 1,872,008, U.S. Pat. No. 4,396,20, U.S. Pat. No. 4,811,888 and U.S. Pat. No. 3,931,489.

However, laser welding processes or arc welding processes each have drawbacks which are specific to them.

In the case of the manufacture of a pipe, the process includes, in general, a phase of forming a pre-tube from a rectangular metal strip or sheet, followed by a phase of welding the pre-tube into a welded pipe.

According to a first technique, the welding is carried out axially, that is to say the metal strip is successively formed into a U and then into an O by bringing its two parallel longitudinal edges together so as to obtain an unwelded pre-tube, and then a longitudinal or axial welding of the two edges of the pre-tube to be butted is carried out with or without a groove in order to obtain an axially welded pipe, shown schematically in FIG. 1.

However, according to a second technique, the welding may be in a helix or spiral. In this case, the metal strip is firstly given a twist in a spiral movement so as to bring together or butt the two longitudinal edges of said strip in a joint plane having the form of a spiral or helix so as to form, here too, an unwelded pre-tube, this pre-tube then being subjected to helical welding so as to join the said two edges together in order to obtain a welded pipe.

Of course, in all cases the pre-tube and the welding head are driven so as to perform a movement of relative displacement one with respect to the other, that is to say either the pipe is stationary and the welding head moves, or vice versa.

The welding phase may be carried out in one or more passes and by using one or more welding processes according to the diameter and the thickness of the pre-tube to be welded.

In general, for thin-walled pipes, that is to say having a thickness of 1 mm to 6 mm, of small diameter, typically from 10 to 100 mm, the tube forming and welding operations are carried out almost simultaneously.

To do this, as mentioned above, a machine fitted with a line of press rollers, with well-defined profiles, progressively and continuously deforms the metal strip moving relative to the said rollers in order to give it the shape of the desired pre-tube, the two ends or longitudinal edges of the pre-tube then being welded together to obtain the pipe.

These operations are carried out at high speed and it is important to use welding processes which allow the desired penetration to be obtained without slowing down the forming process, that is to say also a desired minimum speed making it possible to maintain maximum productivity or, in any case, the highest possible productivity.

Industrial pipe manufacturing lines very often use the multicathode welding process which employs, in general, several plasma or TIG electric arcs aligned in the welding joint plane.

Sometimes, laser welding is also used to weld the pipes. In particular, compared with the multicathode process, the use of a laser makes it possible to increase the speed but to the detriment of increased precision, which therefore requires much more precise alignment of the edges to be welded and precise control of the gap between the edges to be welded. This is very expensive from the standpoint of the tooling to be used.

A process juxtaposing the above techniques is described in the document EP-A-496231 and consists in successively welding the edges of the pre-tube with firstly a laser beam and then with an arc delivered by a tungsten electrode. However, in this case, since the laser welding is carried out first, the problems similar to those mentioned above arise.

Furthermore, for thicker-walled pipes, for example having a thickness of 6 to 50 mm, the forming and welding operations are not in general simultaneous. The tube is firstly given its definitive form, that is to say its pre-tube form, and is then only welded.

For these thicknesses, the process is in general carried out in several passes, typically in three or more passes, namely a pass called seam-locking pass and two welding passes. To do this, the edges to be butted together are X-grooved and, approximately in the middle of the thickness of the joint, a heel is created which allows the seam-locking to be carried out by MIG welding, and which thus prevents any further deformation during the subsequent welding passes. Next, the tube thus seam-locked or prefastened is welded by means of a submerged-arc welding process on the back side and the front side of the joint, as shown in FIG. 3.

In view of this, one of the problems that still arises is to be able to have a welding process allowing effective welding of tubes of any thickness at high speed and/or with a limited number of passes, that is to say making it possible:

either to carry out the initial pass called the seam-locking pass at high speed (in the case of a tube with an X groove);

or to reduce the number of passes (2 instead of 3) by making a Y groove (cf. FIG. 2) instead of an X groove and then carrying out the initial seam-locking pass or the bottom pass at higher speed;

or, for thicknesses of between 6 and 10 mm, to carry out the welding in a single pass and without a groove.

SUMMARY OF THE INVENTION

It is an object of the present invention to solve the abovementioned problems by providing an improved pipe manufacturing process using a hybrid welding process which combines a laser beam with an electric arc.

The solution provided by the present invention is therefore a process for manufacturing a welded pipe from a metal strip having two longitudinal edges which are brought together so as to come approximately into contact with one another and thus form an unwelded pre-tube, the said pre-tube then being welded in order to join the said edges together, characterized in that the two longitudinal edges of the metal strip having a pre-tube form are welded together, in order to obtain a welded metal tube by using, approximately simultaneously, at least one laser beam and at least one electric arc, the said laser beam and the said electric arc combining at a single impingement point or impingement area in the joint plane to be welded so that the metal of the edges to be joined together undergoes localized melting and subsequent hardening into a welded joint which joins together the edges thus assembled.

Within the context of the invention, the longitudinal edges may be brought together:

so as to obtain a weld plane and/or joint which is approximately rectilinear or is helicoidal in shape;

either in a continuous manner, that is to say the edges are brought together gradually and locally as the metal sheet runs in and undergoes 0 forming and then welding; or in an overall manner, that is to say the two edges are brought together in their entirety and then welded (the case with thick-walled pipes).

BRIEF DESCRIPTION OF THE DRAWINGS

FIG. 1 is a schematic representation of an axially welded pipe;

FIG. 2 depicts a Y groove; and

FIG. 3 depicts an X groove.

DETAILED DESCRIPTION OF THE INVENTION

Depending on the case, the process of the invention may include one or more of the following characteristics:

the metal strip is made to move relative to the laser beam and the electric arc which are fixed, so as to produce a continuous welded joint or seam between the said two longitudinal edges, preferably the metal strip being moved by means of drive rollers;

the strip has a thickness of greater than or equal to 10 mm and at most 100 mm. In this case, there is not necessarily almost simultaneous forming and welding, but more generally 0 forming by bringing both edges of the metal sheet in their entirety into edge-to-edge contact, and then merely welding them together;

the sheet has a thickness of less than 10 mm, particularly 1 to 6 mm;

the laser beam is emitted by an Nd:YAG- or $CO_2$-type laser;

the electric arc is a plasma arc and preferably the laser beam and the said arc are delivered by a single welding head;

the edges to be welded are grooved or machined so as to create a heel projecting with respect to the surface of the edges to be welded and the said heels are then welded together by using the laser beam and the electric arc;

the edges to be welded are welded in a single welding pass;

the assist gas for the laser beam and the gas for the electric arc are chosen from argon, helium, nitrogen, hydrogen, oxygen, carbon dioxide or mixtures thereof;

the welding speed is between 5 m/minute and 20 m/minute;

the metal strip is made of a metal or metal alloy chosen from carbon steels, stainless steels, such as austenitic, ferritic, martensitic or duplex steels; high yield strength steels; coated or uncoated steels, nickel alloys, copper alloys and titanium alloys;

a weld seam of helicoidal or spiral shape is formed.

The invention also relates to the use of a hybrid arc/laser, in particular plasma/laser, welding process using, approximately simultaneously, at least one laser beam and at least one electric arc, preferably a plasma arc, to weld together two longitudinal edges of a metal strip which are brought together so as to come approximately into contact with one another and thus form an unwelded pre-tube, and to obtain a welded metal pipe by combining the said at least one laser beam and at least one electric arc.

In other words, it is an object of the invention to use the electric-arc/laser combination either to form/weld pipes in the case of wall thicknesses of less than 6 mm, or to weld pipes having wall thicknesses of between 6 and 10 mm in a single pass, or to carry out the seam-locking pass on X or Y grooves.

This makes it possible, in all cases, to increase the welding speeds and/or to reduce the number of passes without sacrifice to the contacting tolerances which, consequently, remain quite wide, thereby also making it possible to improve the productivity of the manufacturing process thanks to the time saving which results therefrom.

This is because the use of a laser beam alone does not allow the same operations to be carried out with the same joint-positioning freedom, while the plasma welding process alone does not allow the desired welding speeds to be achieved.

In general, a plasma/laser or arc/laser welding process is a hybrid or combined welding process which combines electric arc welding with a laser beam.

The plasma/laser process consists in generating an electric arc between an electrode, which may or may not be consumable, and the workpiece to be welded, and in focusing a powerful laser beam, especially a YAG-type or $CO_2$-type laser, in the arc zone, that is to say near or in the joint plane obtained by joining together, edge to edge, the parts of the pre-tube to be welded together.

Such a hybrid process makes it possible to considerably improve the welding speeds compared with laser welding alone or with arc or plasma welding alone.

As mentioned above, such a hybrid process also makes it possible to appreciably increase the tolerances on positioning the edges of the pre-tube before welding and the permitted clearance between the edges to be welded, particularly compared with laser welding alone, which requires high precision in positioning the parts to be welded because of the small size of the focal spot of the laser beam.

The use of a plasma/laser process, and more generally an arc/laser process, requires the use of a welding head which makes it possible to combine, in a small space, the laser beam and its focusing device, and a suitable welding electrode. Several head configurations are described in the documents specified below and it may be stated, in summary, that the laser beam and the electric arc or plasma jet may be delivered by one and the same welding head, that is to say they leave via the same orifice, or else via two separate welding heads, one delivering the laser beam and the other the electric arc or plasma jet, the two coming together in the welding zone.

Various hybrid arc/laser welding processes have been described, for example in the documents EP-A-793558; EP-A-782489; EP-A-800434; U.S. Pat. No. 5,006,688; U.S. Pat. No. 5,700,989; EP-A-844042; Laser GTA "*Welding of aluminium alloy 5052*" by T. P. Diebold and C. E. Albright, 1984, pages 18–24; SU-A-1815085 and U.S. Pat. No. 4,689, 466; "*Plasma arc augmented laser welding*" by R. P. Walduck and J. Biffin, pages 172–176, 1994; or "*TIG or MIG arc augmented laser welding of thick mild steel plate, Joining and Materials* by J. Matsuda et al., pages 31–34, 1988.

Within the context of the present invention, either of these processes may equally well be used, but on condition that it be adapted to the case in question, that is to say to pipe welding since these documents do not relate to pipe welding.

This is because arc/laser hybrid processes have hitherto been reputed to be completely suitable for welding tailored blanks for the automobile industry, since, in addition to the abovementioned advantages, they make it possible to obtain a weld bead which is well wetted and free of undercuts, as recalled in the documents EP-A-782 489 and "*Laser plus arc equal power*", Industrial Laser Solutions, February 1999, pages 28–30.

What is claimed is:

1. Process for manufacturing a welded pipe from a metal strip having two longitudinal edges and a thickness of less than 10 mm, which comprises:

bringing said two longitudinal edges together so as to come approximately into contact with one another and thus form an unwelded pre-tube;

welding said pre-tube in order to join said edges together and obtain a welded metal tube;

said welding being carried out by using, approximately simultaneously, at least one laser beam and at least one electric arc;

said laser beam and said electric arc combining together at a single impingement point so that the metal of the edges to be joined together undergoes localized melting by the action of the laser beam and the electric arc thereby combined together.

2. The process according to claim 1, wherein the metal strip is made to move relative to the laser beam and the electric arc which are fixed, so as to produce a continuous welded joint or seam between the two longitudinal edges.

3. The process according to claim 2, wherein the metal strip is moved by drive rollers.

4. The process according to claim 1, wherein the strip has a thickness ranging between 1 mm to 6 mm.

5. The process according to claim 1, wherein the laser beam is emitted by an Nd:YAG- or $CO_2$-type laser and the electric arc is a plasma arc.

6. The process according to claim 5, wherein the laser beam and the arc are delivered by a single welding head.

7. The process according to claim 1, wherein the edges to be welded are grooved or machined so as to create a heel projecting with respect to the surface of the edges to be welded and the heels are then welded together by using the laser beam and the electric arc.

8. The process according to claim 1, wherein the edges to be welded are welded in a single welding pass.

9. The process according to claim 1, wherein the laser beams uses an assist gas and the electric arc uses a gas, which gases are selected from the group consisting of argon, helium, nitrogen, hydrogen, oxygen, carbon dioxide and mixtures thereof.

10. The process according to claim 1, wherein the welding is carried out at a speed ranging between 5 m/minute and 20 m/minute.

11. The process according to claim 1, wherein the metal strip is made of a metal or metal alloy chosen from carbon steels, stainless steels, high yield strength steels, coated or uncoated steels, nickel alloys, copper alloys and titanium alloys.

12. The process according to claim 1, wherein a weld seam of helicoidal or spiral shape is formed.

* * * * *